INVENTOR.
KARL P. THEN
BY
Charles A. McClure
ATTORNEY.

Sept. 14, 1965 K. P. THEN 3,205,522
UNIVERSALLY ADJUSTABLE TOOL HOLDER
Filed Aug. 28, 1963 3 Sheets-Sheet 2

INVENTOR.
KARL P. THEN
BY
Charles A. McClure
ATTORNEY.

Sept. 14, 1965        K. P. THEN        3,205,522

UNIVERSALLY ADJUSTABLE TOOL HOLDER

Filed Aug. 28, 1963        3 Sheets-Sheet 3

INVENTOR.
KARL P. THEN.
BY
ATTORNEY.

United States Patent Office 3,205,522
Patented Sept. 14, 1965

3,205,522
UNIVERSALLY ADJUSTABLE TOOL HOLDER
Karl P. Then, 148 Avondale Road, Norristown, Pa.
Filed Aug. 28, 1963, Ser. No. 305,112
6 Claims. (Cl. 15—146)

This invention relates to a position-adjustable holder for a paint brush or other hand tool, especially for use on an extension handle at any desired angle thereto.

Extension handles are useful to enable the user of a paint brush or other hand tool to reach further than normal arm length and to use the tool as so extended. However, simply extended longitudinally, the tool is not readily orientable to cope with corners or other obstacles as when directly hand-held.

A primary object of the present invention is provision of a position-adjustable tool holder useful on an extension handle.

Another object is provision of such a tool holder with universal articulation through a wide angular range.

A further object is provision of such a tool holder with ready adjustability through its entire range of articulation.

Other objects of this invention, together with means and methods for attaining the various objects, will be apparent from the following description and the accompanying diagrams of a preferred embodiment thereof.

In general, the objects of the present invention are accomplished, in a position-adjustable tool holder for use on an extension handle, by a combination of tool-holding means, handle-mounting means, and means interconnecting the handle-mounting and tool-holding means and adapted to maintain them in angularly adjustable relationship to one another. Particular structural features of the component means are described below.

Figure 1:
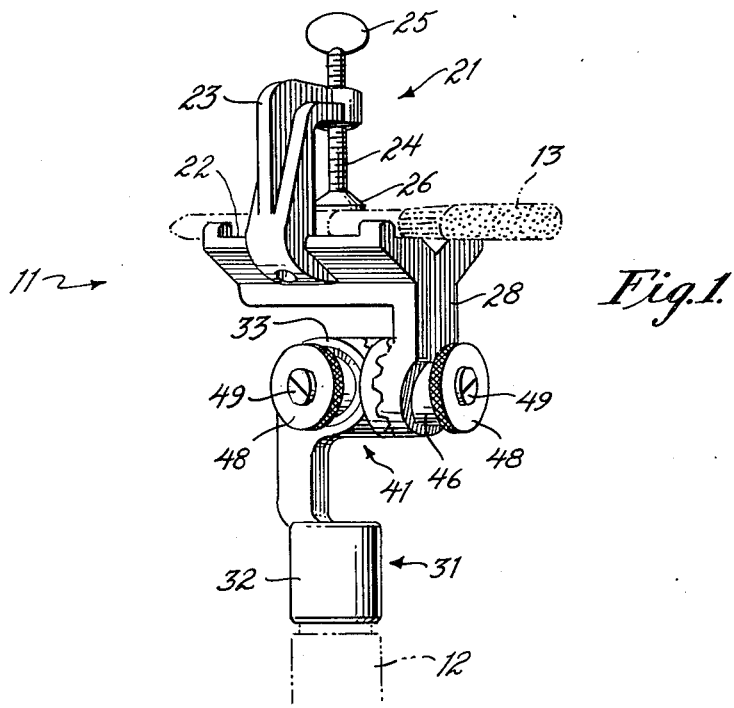
FIG. 1 is a perspective view of such a tool holder mounted on an extension handle.

FIG. 1 shows, in perspective, tool holder 11 of this invention fully assembled, mounted on the end of extension handle 12 (shown fragmentarily), and carrying tool 13 (a paint brush, shown in phantom). The same tool holder is shown, in side and front elevation, respectively, in FIGS. 2 and 3, in which the position shown in solid lines corresponds to that in FIG. 1 while broken lines show the extreme positions of adjustability of component tool-holding means 21, which comprises bed portion 22, clamp bracket 23 affixed to and extending from the bed, clamp 24 threaded through the bracket and including wing 25 and stop 26 at its opposite ends. Handle-mounting means 31 and the means interconnecting it to the tool-holding means remain essentially unchanged in position at and between the extreme positions of the latter. The various parts of the interconnecting means, as well as the relationship of the tool-holding and handle-mounting means thereto and to ane another, are most readily apparent from the exploded perspective view in FIG. 4.

The base of clamp bracket 23 is bored and threaded to receive retaining screw 27 therein through an appropriate bore in bracket bed portion 22, the screw passing first through the bore in the bracket and then through the bore in the bed portion. Base 32 of handle-mounting means 31 is bored and threaded to receive the conventionally threaded end of the handle. Opposite end 33 of the handle-mounting means is generally cylindrical, with central bore 34 and laterally extending, radially splined boss 35 coaxial theerwith. Bed portion 22 of the tool-holding means has flange 28 extending therefrom in the opposite direction from the clamp bracket and terminating in a generally cylindrical portion with central bore 29 and radially splined boss 30 thereon extending laterally toward the space underneath the bed.

The means interconnecting the handle-mounting and tool-holding means comprises elbow 41, which has circular radially splined boss 42 on one end to engage boss 35 of the former and like boss 43 on the other end to engage boss 30 of the latter. All the bosses have twelve radial splines each so that each pair of bosses will interengage at any of a dozen positions angularly separated from one another by thirty degrees, except as certain positions are prohibited because of spatial interference of the adjacent parts, as indicated by the extreme positions in FIGS. 2 and 3. Each spline has sloping side edges to facilitate disengagement of interengaged bosses upon relative angular movement about their common axis and thereby permit adjustment to another angular position where the splines of the respective adjacent bosses reengage.

The interconnecting means also comprises duplicate locking and unlocking means, which cooperate with the radially splined bosses to provide coupling mechanisms effective to secure the handle-mounting and tool-holding means of the tool holder in adjustably fixed relation to one another. Each coupling mechanism includes, in the order of appearance in the exploded view, FIG. 4, beginning at the smooth dished surface on the outer face of the flanges of the respective handle-mounting and tool-holding means, thrust washer 44, compression spring 45, spring-surrounding collar 46, locking screw 47, locking nut 48, and assembly-securing screw 49. The securing screw extends through the bores in the interengaged bosses and all the other coupling components to bottom in a threaded bore in elbow 41 and holds the coupling components together while permitting the interengaged bosses thereof to be disengaged for relative angular movement only in the unlocked condition of the coupling, as explained below.

Cylindrical portion 48b of the locking nut of the coupling mechanism is threaded internally (preferably a multiple-start thread) to engage with locking screw 47 and is of appropriate diameter to fit inside collar 46 and spring 45. Adjoining flat circular portion 48a of the locking nut bears against the rolled edge of the collar overlying the near end of the spring and is knurled on its peripheral surface, which is sufficiently large to be readily turned by hand. The other end of the spring bears against the thrust washer, which seats in the smooth dished surface of the flange face.

Figure 5:
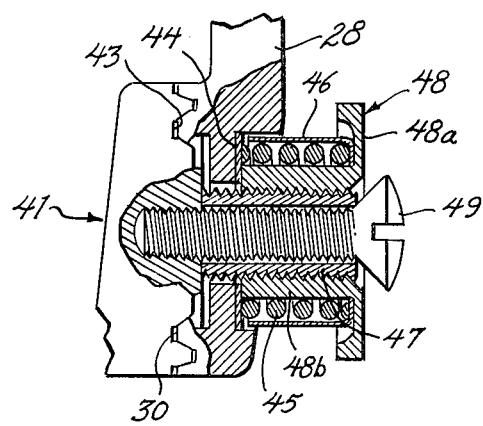
FIG. 5 is a fragmentary side elevation, partly in section, of an adjustable portion in locked condition.
Figure 6:
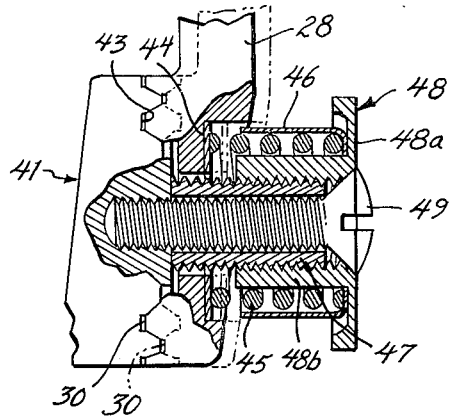
FIG. 6 is a like view of the same portion in unlocked condition, showing in phantom a displaced position of part thereof incident to angular adjustment.

Only a fraction of a turn clockwise (right-hand thread) is required to lock the coupling by advancing locking nut 48 sufficiently that the interengaged radial splines of the adjacent bosses cannot be disengaged even to an extent sufficient to permit relative angular movement about the axis of securing screw 49. Such locked condition is shown in FIG. 5. Conversely, in the unlocked condition of the coupling, corresponding to counter-clockwise rotation of the locking nut (restrained by the securing screw), such angular movement is possible by applying sufficient force in the desired movement direction to overcome the force of spring 45 biasing the respective radially splined bosses into mutual engagement. The unlocked condition appears in FIG. 6, which shows in phantom the displaced position of thrust washer 44 and flange 28 as the radial splines on the respective bosses are opposed upon disengagement.

Figure 2:
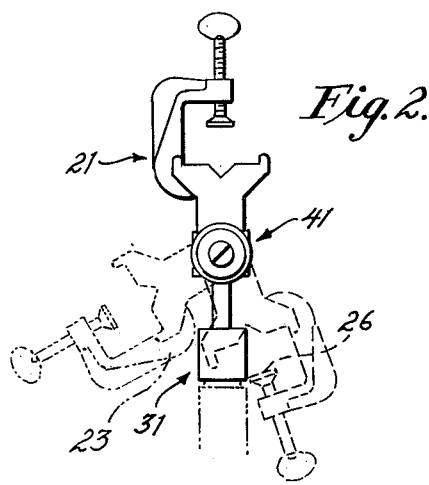
FIG. 2 is a side elevation showing the tool holder of FIG. 1 in corresponding position in solid lines and showing in phantom lines extreme positions of angular adjustability in the plane of the view.
Figure 3:
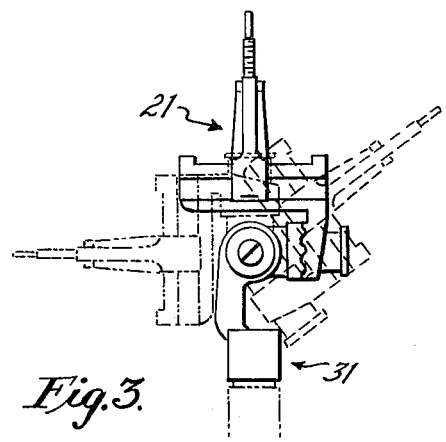
FIG. 3 is a front elevation showing the same tool holder in corresponding intermediate (solid) and extreme (phantom) positions of angular adjustability in the plane of the view.
Figure 4:
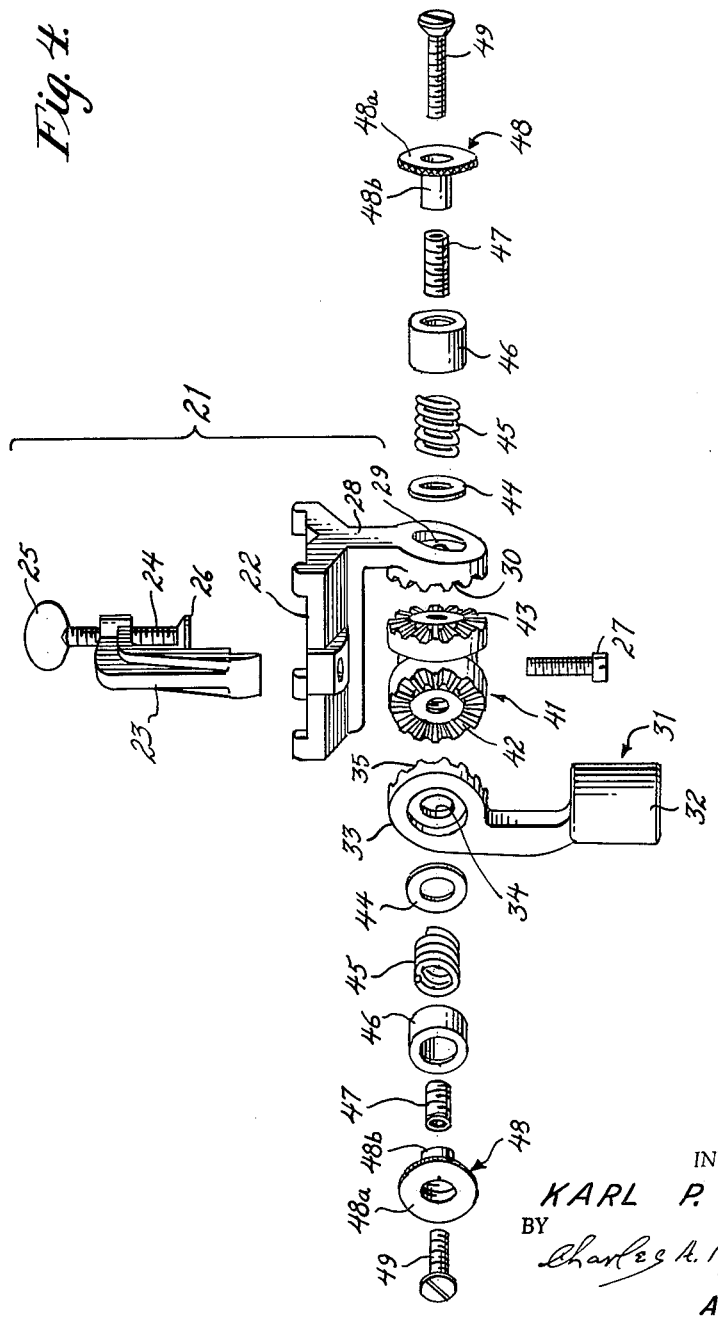
FIG. 4 is an exploded perspective view of the same tool holder.

It is apparent from the extreme position of adjustment shown in FIGS. 2 and 3 and from the above description that sixty actual positions of tool-holding means 21 relative to handle-mounting means 31 are provided (the product of six positions through 150° in the plane of FIG. 3 and ten positions through 270° in the plane of FIG. 2), any of which may be selected by releasing the coupling locking nuts and be maintained by tightening them to lock the coupling mechanism. This variety of positions is sufficient for all or nearly all practical purposes, but greater variety may be achieved by using more numerous, finer radial splines to reduce the angle between adjacent positions, if desired. The advantages of having an immediately and universally adjustable tool holder are obvious.

While the embodiment described and illustrated is preferred as presenting a maximum of convenience at a minimum of complication and cost, it may be modified by variation in shape, size, state of combination or subdivision of parts, or otherwise while retaining important advantages and benefits of the invention, which is defined in the following claims.

What is claimed is:

1. Position-adjustable tool holder for use on an extension handle, comprising tool-holding means, handle-mounting means, and means interconnecting the handle-mounting and tool-holding means and adapted to maintain them fixed but adjustable with respect to one another within a range of angles in two mutually perpendicular planes intersecting one another in line with the handle axis, each of the first two mentioned means having a boss thereon with a radially splined face engageable with a similar face on the interconnecting means, and the interconnecting means having two bosses thereon oriented perpendicular to one another, each having a similar radially splined face engageable with the face on one of the first two mentioned means.

2. Position-adjustable tool holder for use on an extension handle, comprising tool-holding means including a clamping device having a bed portion adapted to hold a paint brush or the like fixed thereon, handle-mounting means, and means interconnecting the handle-mounting and tool-holding means and including a pair of coupling mechanisms adapted to maintain them fixed but adjustable with respect to one another within a range of angles in two mutually perpendicular planes intersecting one another in line with the handle axis, each coupling mechanism having an adjusting nut, the two adjusting nuts being located on axes lying in a common plane perpendicular to both the aforementioned mutually perpendicular planes.

3. Position-adjustable apparatus comprising a pair of mutually engageable devices rotatably adjustable relative to one another about a common axis upon mutual disengagement thereof in the axial direction and fixed relative to one another when mutually engaged, each of such devices having a radially splined face engageable with the like face of the other device, externally threaded securing means affixed coaxially to one of the devices and extending axially through a smooth bore in the other device and terminating in an enlarged head for holding the devices together both when engaged and when disengaged for rotatable adjustment, and, surrounding the securing means, biasing means for urging the devices into engagement, and locking means threaded onto the securing means and rotatably adjustable thereabout between locked and unlocked positions, being effective to preclude disengagement of the devices in the locked position and to permit disengagement for rotatable adjustment thereof in the unlocked position.

4. Position-adjustable apparatus comprising a pair of mutually engageable devices having interengageable radially splined faces rotatably adjustable relative to one another about a common axis upon mutual disengagement thereof in the axial direction and fixed relative to one another when mutually engaged, an externally threaded screw coaxial therewith and removable therefrom, threaded into fixed relation with one of the devices through a smooth bore in the other device and having a head for holding the device together both when engaged and when disengaged for rotatable adjustment, an externally threaded sleeve surrounding the screw and secured thereby in fixed relation to the first one of the devices through the smooth bore of the other device, a locking nut threaded onto the sleeve and rotatably adjustable thereabout between locked and unlocked positions, the nut having an end portion thereof adjacent the other device and having an opposite end portion exposed for manipulation to vary the distance measured in the axial direction between the other device and the adjacent end of the nut, thereby being effective to preclude disengagement of the devices in the locked position and to permit disengagement for rotatable adjustment thereof in the unlocked position, and a compression spring surrounding the locking nut for compression between the exposed end thereof and the other device as biasing means for urging the devices into engagement.

5. Coupling mechanism for a pair of mutually engageable devices rotatably adjustable relative to one another about a common axis upon mutual disengagement thereof in the axial direction and fixed relative to one another when mutually engaged, comprising a coaxial screw adapted to extend through a smooth bore in one such device and into a threaded bore into the other device and having a head for holding the devices together both when engaged and when disengaged for rotatable adjustment without rotation of the screw, an externally threaded sleeve surrounding the screw, a locking nut threaded onto the sleeve and being rotatably adjustable thereabout between locked and unlocked positions, being effective to preclude disengagement of the devices in the locked position and to permit disengagement for rotatable adjustment thereof in the unlocked position, a compression spring for urging the devices into engagement surrounding a portion of the locking nut, and a collar surrounding the compression spring.

6. Position-adjustment apparatus comprising a pair of devices having mutually engageable radially splined bosses rotatably adjustable relative to one another about a common axis upon mutual disengagement thereof in the axial direction and fixed relative to one another when mutually engaged, one of the devices having a threaded axial bore and the other device having a larger smooth bore, a screw having a head at one end and extending through the smooth bore in the other device and threaded into the bore of the first device to terminate therein in removable fixed relation thereto for holding the devices together both when engaged and when disengaged for rotatable adjustment without rotation of the screw, an externally threaded sleeve surrounding the body of the screw and being secured between the other device and the head of the screw in fixed relationship thereto while the screw is in place, a thrust washer surrounding the sleeve and adjacent the other device, a nut threaded onto the sleeve and rotatably adjustable thereabout between a locked position in which one end is juxtaposed to the thrust washer and an unlocked position in which it is spaced therefrom, thereby being effective to preclude disengagement of the devices in the locked position and to permit disengagement for rotatable adjustment thereof in the unlocked position, a compression spring surrounding the body of the screw and bearing at one end against the thrust washer, a collar surrounding the compression spring and having one end rolled adjacent the inner edge of the locking nut head, the compression spring bearing at its other end against the rolled end of the collar and urging the radially splined bosses into mutual engagement.

References Cited by the Examiner
UNITED STATES PATENTS

| | | | |
|---|---|---|---|
| 152,952 | 7/74 | Mason et al. | 306—17 |
| 432,130 | 7/90 | Fenton. | |
| 1,073,568 | 9/13 | Conklin | 306—17 |
| 1,525,438 | 2/25 | Boone | 15—146 |
| 1,697,710 | 1/29 | Bostroem | 287—14 |
| 1,853,153 | 4/32 | Skeel | 287—14 |
| 2,024,930 | 12/35 | Judell. | |
| 2,581,141 | 1/52 | Raptis | 15—144.1 |
| 2,763,517 | 9/56 | Strand | 15—144.1 X |

FOREIGN PATENTS 945,536   7/56   Germany.

DANIEL BLUM, *Primary Examiner.*
CHARLES A. WILLMUTH, *Examiner.*